TICAL:

(12) United States Patent
Nock et al.

(10) Patent No.: US 9,884,693 B2
(45) Date of Patent: Feb. 6, 2018

(54) ENVELOPING AERODYNAMIC DECELERATOR

(71) Applicant: Global Aerospace Corporation, Irwindale, CA (US)

(72) Inventors: Kerry T. Nock, Irwindale, CA (US); Kim M. Aaron, Irwindale, CA (US); Angus D. McRonald, Altadena, CA (US); Kristin L. Gates, Los Angeles, CA (US)

(73) Assignee: GLOBAL AEROSPACE CORPORATION, Irwindale, CA (US)

( * ) Notice: Subject to any disclaimer, the term of this patent is extended or adjusted under 35 U.S.C. 154(b) by 115 days.

(21) Appl. No.: 14/543,694

(22) Filed: Nov. 17, 2014

(65) Prior Publication Data
US 2016/0137320 A1 May 19, 2016

(51) Int. Cl.
*B64G 1/62* (2006.01)
*B64G 1/22* (2006.01)
*B64G 1/58* (2006.01)

(52) U.S. Cl.
CPC .............. *B64G 1/62* (2013.01); *B64G 1/222* (2013.01); *B64G 1/58* (2013.01); *B64G 2001/224* (2013.01)

(58) Field of Classification Search
CPC ...... B64G 1/62; B64G 2001/224; B64B 1/40; B64B 1/60; B64B 1/58; B64D 17/343; B64D 1/12
See application file for complete search history.

(56) References Cited

U.S. PATENT DOCUMENTS

| 3,508,724 | A | * | 4/1970 | Scher | B64G 1/62 244/1 R |
| 3,614,031 | A | * | 10/1971 | Demboski | B64B 1/62 244/138 R |
| 4,366,936 | A | * | 1/1983 | Ferguson | B64B 1/00 244/127 |
| 4,752,050 | A | * | 6/1988 | Johnson | B64D 17/343 244/149 |
| 5,242,134 | A | | 9/1993 | Petro | |
| 6,264,144 | B1 | * | 7/2001 | Thornton | B64G 1/58 244/113 |
| 6,830,222 | B1 | * | 12/2004 | Nock | B64G 1/242 244/110 D |
| 8,812,176 | B1 | * | 8/2014 | Biffle | B64B 1/62 244/175 |
| 8,820,678 | B2 | * | 9/2014 | DeVaul | G05D 1/104 244/96 |
| 9,096,301 | B1 | * | 8/2015 | Biffle | B64B 1/42 |

(Continued)

FOREIGN PATENT DOCUMENTS

RU 2133697 7/1999
RU 2381967 2/2010

*Primary Examiner* — Valentina Xavier
(74) *Attorney, Agent, or Firm* — Smyrski Law Group, a P.C.

(57) ABSTRACT

An inflatable aerodynamic deceleration method and system is provided for use with an atmospheric entry payload. The inflatable aerodynamic decelerator includes an inflatable envelope and an inflatant, wherein the inflatant is configured to fill the inflatable envelope to an inflated state such that the inflatable envelope surrounds the atmospheric entry payload, causing aerodynamic forces to decelerate the atmospheric entry payload.

23 Claims, 13 Drawing Sheets

(56) References Cited

U.S. PATENT DOCUMENTS

2004/0065773 A1\* 4/2004 Morales ................. A01G 15/00
  244/30
2006/0000945 A1\* 1/2006 Voss .......................... B64B 1/60
  244/97
2015/0284065 A1\* 10/2015 MacCallum ........... B64D 17/22
  244/30

\* cited by examiner

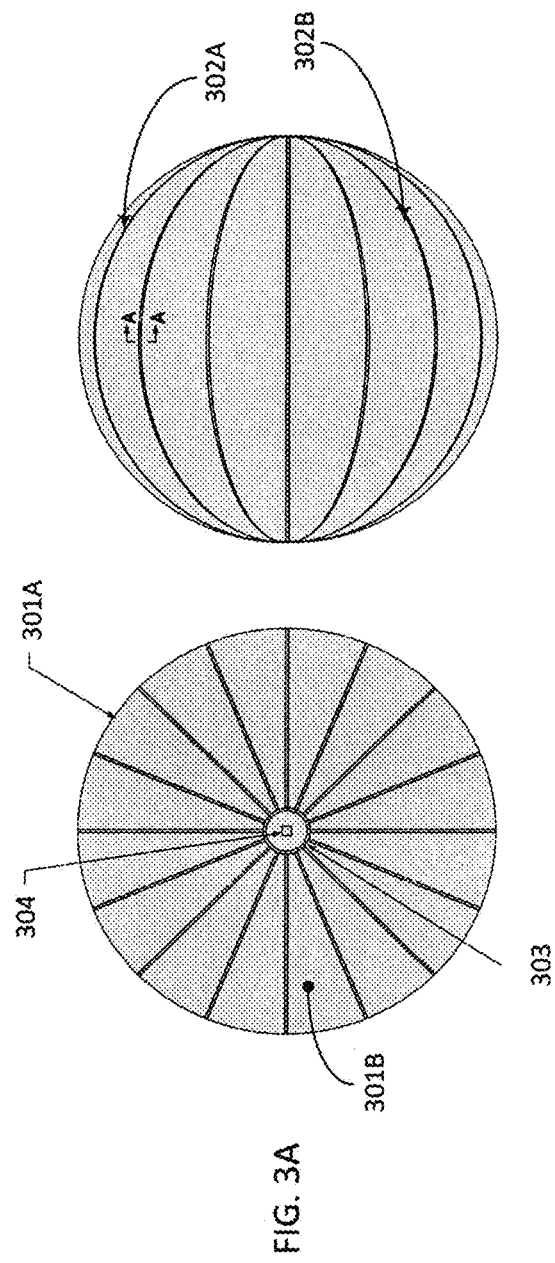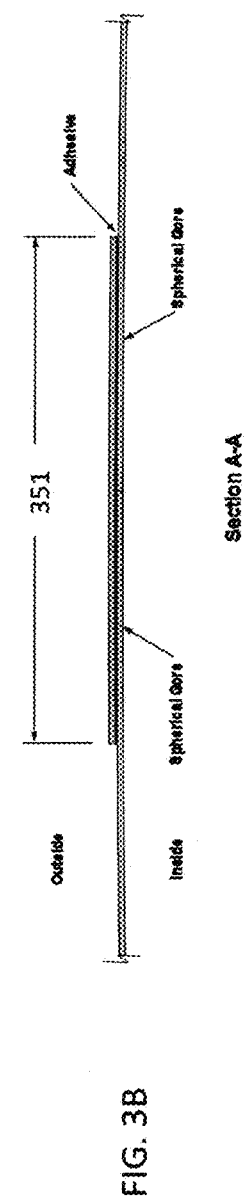
FIG. 3A
FIG. 3B

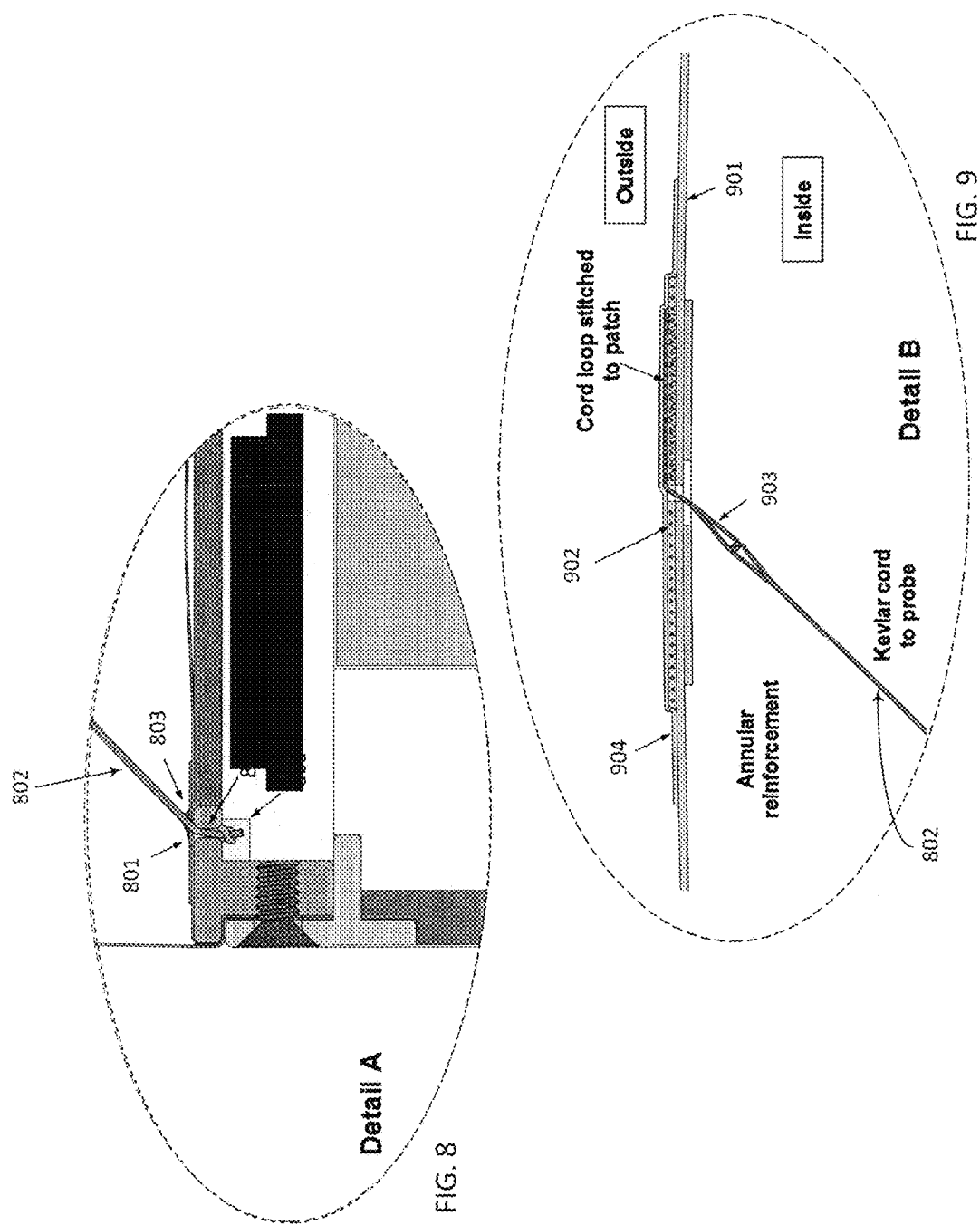

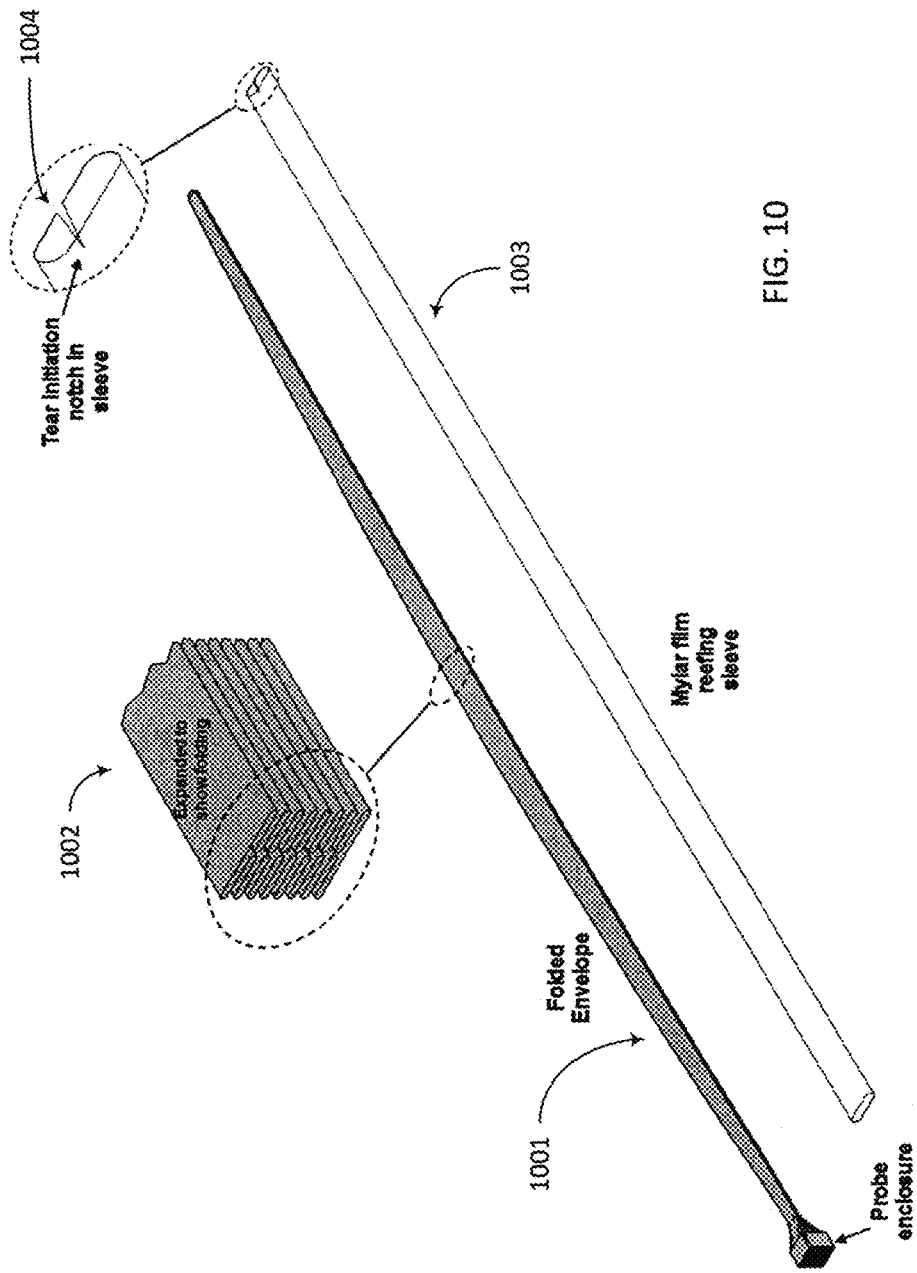

ENVELOPING AERODYNAMIC DECELERATOR

This invention was made with government support under Contract No. NNX11CI01P awarded by the National Aeronautics and Space Administration (NASA) Small Business Technology Transfer (STTR) element of the Small Business Innovation Research (SBIR) Program. The government has certain rights in the invention.

BACKGROUND OF THE INVENTION

Field of the Invention

The present invention relates generally to atmospheric entry vehicles and deceleration apparatus associated therewith, and more specifically to decelerator devices employed to slow the descent of payloads during atmospheric entry.

Description of the Related Art

A complicated aspect of space travel is the atmospheric entry phase, wherein the space system enters the atmosphere of the Earth or other planets and moons with atmospheres and can be subjected to extreme heat conditions. Certain payloads need to enter the atmosphere and descend safely to the surface, but the challenges involved are many. A number of solutions have been employed, but in general, there is a strong desire to provide a highly efficient and lightweight solution.

Entry vehicles with payloads typically employ heat shielding. Current rigid atmospheric entry heat shields, or aeroshells, are limited by the size of the shroud (launch vehicle payload fairing). By nature, this means that the size must be relatively small even for very large payloads. For a given system mass, the smaller the characteristic size of the aeroshell, the higher the heating rate during entry. Such heat shields must be made of insulating materials that can tolerate very high temperatures and stagnation pressures. Even on the back surfaces, the temperatures of gases flowing around the heat shield are very high, typically requiring a rigid aft heat shield covered with insulating material resistant to high temperatures to protect the payload. The thermal protection system (TPS) materials are typically ablative or high-temperature reflective type materials that reduce heat flux into the payload or vehicle. TPS requires weight, structural support, and volume that displace payload weight and volume.

Past and current research and development of inflatable aerodynamic decelerators (IAD), such as the NASA Inflatable Re-entry Vehicle Experiment (IRVE), and the Low-Density Supersonic Decelerator (LDSD), increase the area of the heat shield as compared with a rigid aeroshell. However, temperatures and stresses are still very high and require special softgoods to withstand the environment and bulky inflation systems.

Current deployable aeroshells are very complex with many technical challenges yet to be overcome. They rely on one or more internal, inflated envelopes or bladders contained within a high-temperature fabric support structure. These designs are sometimes referred to as tension cone or stacked toroidal tension cone systems. Such inflated decelerators require less stowed volume than rigid aeroshells and as a result larger payloads can be launched with smaller launcher shrouds. However, while these inflated aerodynamic decelerators can be somewhat larger in size than a rigid aerodynamic decelerator for the same payload mass and decelerator mass, they are still small enough to result in relatively high heating rates.

Because these types of inflatable aerodynamic decelerators are opaque to entry heat flux and can only radiate from the surface facing the flow, heat can build up on surfaces and create damaging temperatures. For this reason, TPS materials, like ceramic fabrics (e.g. Nextel fabrics), are applied to protect underlying materials and inflated bladders, especially at the stagnation point and around the edges where the radius of curvature is small. Localized heating is significantly higher when the radius of curvature of the surface is smaller. As with the rigid aeroshells, TPS materials add extra mass and volume to the inflatable aerodynamic decelerators reducing mass and volume available to the payload.

All these complexities lead to fabric structures with relatively high areal densities (mass per unit projected area). The successful IRVE-2 system launched in 2009 had a rough projected area (cross-sectional area) areal density of about 2,100 $g/m^2$ (mass of envelope divided by the projected area facing the flow). This mass does not include inflation, control and support structure masses, which for the IRVE system required over 80% of the mass of the entry system (~70 kg vs. the ~15 kg envelope). If the mass of the overall system is constrained, as it usually is, this implies reduced payload mass.

Current rigid atmospheric entry aeroshells thus require relatively large mass and volume for TPS and a large launch vehicle shroud for their use, which limits the entry payload capability or requires larger and expensive launch vehicles for their deployment in orbit than otherwise would be needed. Past and current inflatable aerodynamic decelerators under research by NASA and others, which may have attitude controllability, can be stowed in smaller volumes, but still require substantial mass and volume for high-temperature TPS materials thus severely reducing payload mass capability.

Some inflatable aerodynamic decelerators are configured as large drag bodies trailing behind the rigid portions of the system. Such a decelerator may be called a ballute, which is a contraction of balloon and parachute. A ballute can potentially increase the drag area more than an inflatable torus around the periphery of a rigid aeroshell because it is not confined to fit in the annular region around the rigid aerosphell and the launch vehicle payload fairing during launch. Ballutes described in the literature may be attached directly to the aft portion of the rigid part of the system or may trail on cables. In either case, the rigid portion of the system is still exposed to the oncoming hypersonic flow, which requires the use of thermal protection system (TPS) materials to prevent damage due to the very high temperatures of the flow field interacting with the solid surface.

In light of the foregoing, it would be advantageous to offer a light decelerator design that decreases the heat issues and other drawbacks of previous entry system designs.

SUMMARY OF THE INVENTION

According to one aspect of the present design, there is provided an inflatable aerodynamic decelerator for use with an atmospheric entry payload. The inflatable aerodynamic decelerator comprises an inflatable envelope and an inflatant. The inflatant is configured to fill the inflatable envelope to an inflated state such that the inflatable envelope surrounds the atmospheric entry payload, causing aerodynamic forces to decelerate the atmospheric entry payload. Such a design can protect the payload from aerodynamic heating issues and simultaneously decelerate the payload during entry.

According to a second aspect of the present design, there is provided an apparatus, comprising a payload and an inflatable envelope configured to be inflated to include the payload by an inflatant. The inflatant filling the inflatable envelope to an inflated state causes the inflatable envelope to surround the payload and aerodynamic forces to decelerate the atmospheric entry payload.

According to a third aspect of the present design, there is provided a method for causing a payload to descend at a desired rate, comprising providing an inflatable envelope and inflating the inflatable envelope to an inflated state, wherein the inflatable envelope surrounds the payload when inflated to the inflated state, causing aerodynamic forces to decelerate the atmospheric entry payload.

These and other advantages of the present invention will become apparent to those skilled in the art from the following detailed description of the invention and the accompanying drawings.

BRIEF DESCRIPTION OF THE DRAWINGS

The present invention is illustrated by way of example, and not by way of limitation, in the figures of the accompanying drawings in which:

FIG. 3A illustrates envelope design including the various envelope gores and associated elements;

FIG. 3B shows the envelope in a view along line A-A in FIG. 3A;

FIG. 8 shows a first detailed view of cord placement and location;

FIG. 9 illustrates a second detailed view of cord placement and location;

FIG. 10 shows envelope packing using a reefing sleeve;

Figure 1:
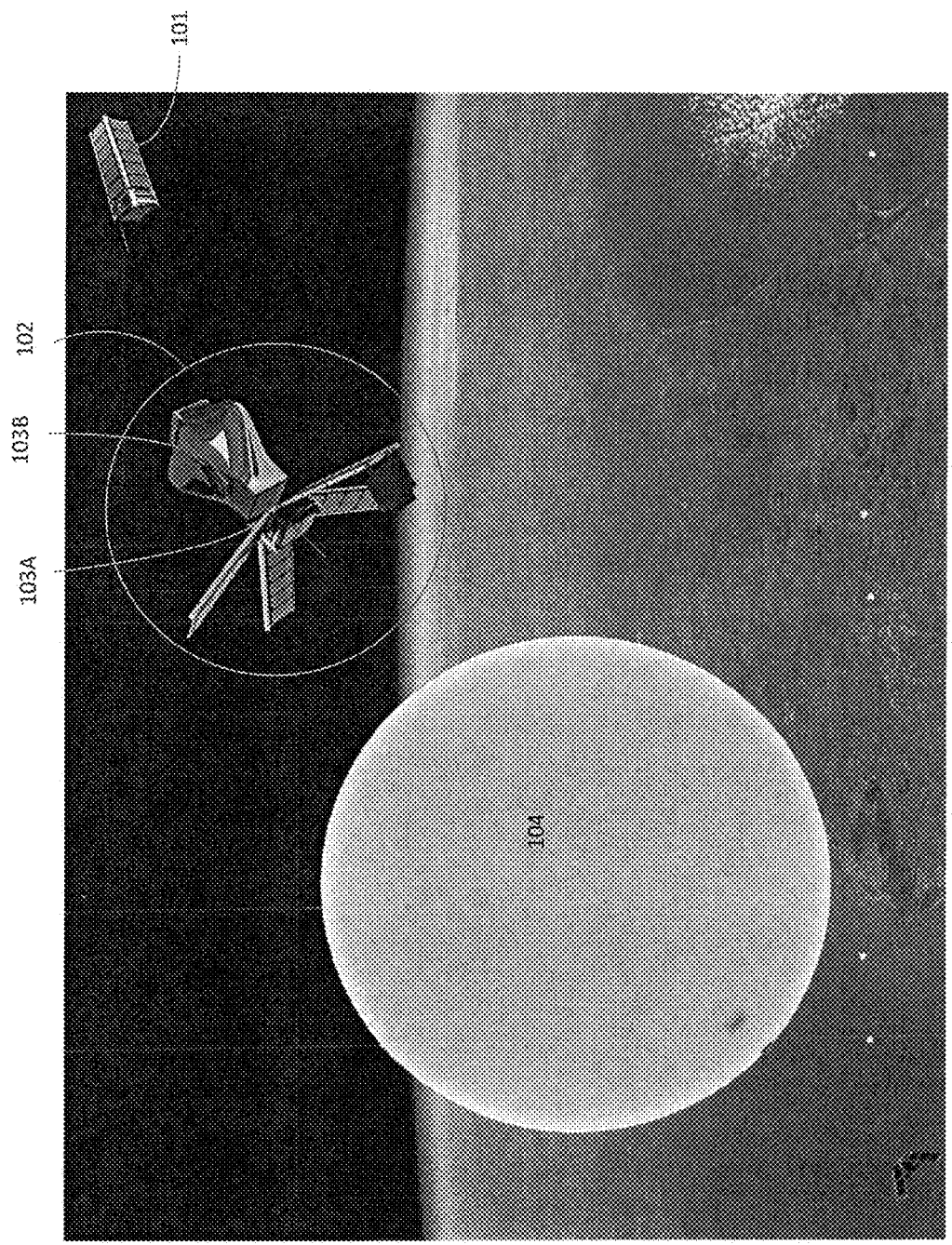
FIG. 1 illustrates an example of an entry system in accordance with the present design at various stages of entry.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

The present design provide deceleration for space systems using a very large lightweight balloon envelope design, specifically an ultra-low ballistic coefficient entry system employing materials not normally considered for atmospheric entry. This technology protects a payload from the harsh atmospheric entry environment and slows the payload so that it can land without damage.

The present ultra-low density aerodynamic decelerator design significantly reduces the mass fraction of the deceleration system as compared to rigid aeroshells or past and current inflated aerodynamic decelerators, where mass fraction is the mass of the aerodynamic decelerator divided by total system mass. This technology offers more payload mass, requires appreciably less entry system volume for stowage, and provides more flexible packing on launch vehicles than other entry technologies.

The present design reduces the overall challenge of the entry environment by using an extremely thin film to form a balloon-like envelope of relatively large diameter and area. A very lightweight envelope with a relatively large cross-sectional area combined with the payload mass, results in very low ballistic coefficient B (defined to be equal to total system mass (m) divided by (drag coefficient ($C_d$) multiplied by projected area (A)) resulting in deceleration at higher altitudes and therefore with lower heating rates. Use of a very thin film facilitates radiating of a significant amount of entry heat flux through the film, preventing heat flux build up in the film where it can increase temperature, with the added benefit of being low mass with a low storage space requirement. In addition, heat that is deposited in the film can radiate away from both the front and rear sides of the film, further keeping temperature buildup low. The envelope diameter is large enough to reduce entry heating by two to three orders of magnitude over rigid aeroshells and at least an order of magnitude lower than past and current inflatable aerodynamic decelerators. Heat flux can be so low as to allow the use of, for example, bare commercial Kapton® film as the aeroshell material. For very small payloads, the thin film alone is enough to withstand the g-load forces on the envelope. For larger payloads, combining the film with very high-strength, high-temperature scrim materials, such as Zylon® fiber, enables the envelope to withstand high g-load forces caused by the payload without significantly reducing the envelope's transparency to thermal radiation.

In the present design, the payload is surrounded by the envelope. Others have suggested the use of an inflated ballute to act as the drag device, but such devices have traditionally been configured as trailing drag devices either attached directly to the aft end of the payload or trailing on cables. In this situation, the payload is still exposed to the hypersonic flow and requires separate TPS. Furthermore, shock waves form in the gas as the gas flows around the payload and these shock waves impinge on the ballute fabric, causing very high localized heating as well as large changes in pressure along the skin of the ballute. Surrounding the payload inside the envelope tends to eliminate these shock waves. If the payload is completely inside the envelope, there is no need for separate TPS. If the front surface of the payload is flush with the envelope, localized TPS may still be needed, but the smooth large radius front surface does not produce shockwaves impinging on the envelope material. The envelope itself produces shockwaves in the gas flowing around the sides, but these shock waves are completely in the gas outside the envelope and do not impinge on the envelope. The very large nose radius further reduces the stagnation point heating as is well-known for very high speed hypersonic flow. The heating rate is inversely proportional to the square root of the nose radius. Therefore, as the nose radius increases, the local heating per unit area goes down. This reduction is in comparison to a smaller object traveling at the same speed in the same gas. But in addition, the very low ballistic coefficient means that this is all happening at a higher altitude with lower density air, which compounds the reduction in heating greatly simplifying the engineering challenges.

Depending on the nature of the payload and how the payload is surrounded by the inflated envelope, access may be needed to the payload by portions of the space system outside of the envelope. In anticipation of this potential need, the payload may be mostly encased within the envelope, but with a flush close-out panel forming a continuous smooth surface with the inflated envelope, acting as the equivalent of fully encapsulating the payload inside the envelope.

The present design can also provides deceleration for space systems using a large inflatable envelope that surrounds, or envelops, the payload. The inflatable envelope could be fabricated of heavy weight, high-temperature-resistant softgoods as for typical current inflatable aerodynamic decelerators.

In addition, internal load restraints may be used to provide a load path from the payload into the envelope to spread the loads out and keep the envelope shape under high heat flux conditions in the presence of high g-loads.

Inflating the envelope may occur using a gas tank, such as a helium tank, with plumbing and valves, gas trapped inside the envelope and restrained by the surrounding structure, subliming solids or evaporating liquids trapped inside the envelope, reacting chemicals to produce a gas, and/or any combination of the foregoing.

One embodiment uses a small spherical pressure vessel to store helium at a pressure of a few thousand psi to inflate the envelope. An advantage of this method is the ability to control the flow rate of inflation gas into the envelope using valves. Another embodiment is to trap gas inside the envelope and have the surrounding structure act as the restraint. In other words, the envelope is positioned inside the pressure vessel. The advantage of this is that there would not be any separate tank, plumbing, valves, and so forth, and the pressure inside the "pressure vessel" would be lower than for the helium tank embodiment discussed above. The volume inside the envelope is pressurized to a level such that once the envelope is fully inflated in the vacuum of space, it would have the desired pressure of about 50 Pa.

A further embodiment is trapping inflatants in the solid or liquid phase inside the envelope on the ground prior to launch. Low vapor pressure liquids or subliming solids trapped inside the envelope avoid the issue of dangerous amounts of stored potential energy. The mass of helium needed for this particular application is on the order of two grams But the molecular weight of substances that either sublimate or vaporize near room temperature are much higher than for helium, and the mass of inflatants needed is measurable, i.e. several tens of grams, but in this arrangement will not displace any significant extra volume during stowing of the envelope. Subliming solids may include d-Camphor, Naphthalene, Benzoic acid, Anthracene, and Anthraquinone, as well as Cyclohexanol, phenol, Chloroacetic acid, Maleic anhydride, 2,5-Xylenol, Tiglic acid, and/or 3,5-Xylenol. The inflatant may alternately be provided in the form of a gas, and may in some instances comprise atmospheric gas, i.e. air. Further, combinations of inflatant materials may be provided, e.g. two solid inflatants, two liquid inflatants plus one solid inflatant, etc. In sum, the inflatant may comprise one or more of any combination of solids, liquids, and/or gases.

To provide a concrete design example, the current invention has been configured to return a small payload of a few hundred grams from low earth orbit at the end of an in-space scientific investigation using a CubeSat. In particular, this system was designed to work with a 3U CubeSat, which has a mass of a few kilograms. Only a small portion—the payload—needs to be returned safely to the earth for recovery. The rest of the CubeSat is allowed to burn up during entry following completion of the space mission. The small payload along with the inflatable drag envelope constitute a small probe reentry system (SPRS). The SPRS could be employed with different types of space systems, including different sizes of CubeSats, which are often carried into space within and then ejected via spring from a Poly Picosatellite Orbital Deployer (P-POD). It is also possible to use the SPRS to return a payload from a suborbital trajectory, as would be the case with a payload launched using a sounding rocket.

The CubeSat system consists of an Orbital Bus, which includes all structure, power, control and communications for handing all orbital modes; a Sample Probe, which includes thermal components, power components, entry data collection and control components; and the inflatable aerodynamic decelerator (IAD) System, which includes mounting and support for the Sample Probe, the inflatable envelope, and a subliming solid inflation subsystem. To keep the thermal load low on both the inflatable envelope and the Sample Probe, the Sample Probe is mounted within the envelope with a closeout feature to enable access to the Sample Probe right up until installation in the P-POD. A closeout feature in this instance indicates that access to the Sample Probe is available upon installation and may be available until such time as the inflatable envelope and Sample Probe are jettisoned from the rest of the space system. The Orbital Bus also provides a restraining function to keep the envelope stowed until the end of the space mission. At the appropriate point in the sequence, the Orbital Bus releases the spring-loaded panels forming the enclosure around the SPRS. Prior to launch, an appropriate gas producing substance or combination of substances such as a subliming solid material, perhaps in powder form, or a vaporizing liquid, is sealed inside the envelope and ultimately acts to produce a low-pressure gas to act as the inflatant for the envelope. Once this restraint is released, the substance(s) produce gas at a very low pressure depending on the temperature of the substance. This inflates the envelope gently before the actual entry sequence and keeps the envelope taut during entry.

FIG. 1 illustrates the entry vehicle 101, for example a 3U CubeSat, an intermediate jettisoned representation 102 of the Orbital Bus including deployed panels, the Sample Probe 103A and envelope 103B in partially deployed state, and the fully deployed decelerator 104 including the Sample Probe (not shown within decelerator 104 in this view). Entry vehicle de-orbit is initiated by deployment of the SPRS IAD system. Upon activation of the side panel release via onboard command, the end panel swings back just as the four side panels of the Orbital Bus swing back nearly 180°, exposing the combined IAD and Sample Probe. In addition to the inertia of the moving side panels, a spring or springs on the Orbital Bus push against the SPRS Small Probe and IAD system to ensure sufficient separation before envelope inflation. The entry system, packaged in a relatively small volume, consists of the box-shaped Sample Probe packaged with the IAD envelope, all packaged within a polymer sleeve used to reef the envelope for controlled deployment and reduced leakage of subliming solid gases through envelope seams during storage before launch and during the orbital phase. Once the mechanical pressure of the side panels is released, the envelope and reefing sleeve begin to inflate with gases coming from one or more subliming solids. The reefing sleeve may include a frangible ripping feature that allows it to peel away from the rapidly expanding spherical envelope and be jettisoned into space. Inflation may only require a few seconds. Afterward the envelope is fully inflated, but not yet at the full operating pressure for entry, which may be in the range of 50 Pa, about five times peak stagnation pressure.

Inflation can be by means of various substances, including but not limited to vaporizing liquids or subliming solids. This feature can significantly reduce the mass of the overall system. In fact, if subliming solids are employed, two types can be used: first, one that initiates the inflation at low pressure and second, upon initial entry heating, supplies additional internal pressure needed to offset the maximum external stagnation pressure of entry.

After IAD deployment, the Orbital Bus continues on ahead of the entry system while the discarded reefing sleeve very rapidly decelerates behind the entry system. At a later time, the SPRS transitions from free molecular flow transition flow regime. Subsequently the system reaches the peak entry heating level. Most envelope film temperatures are expected to remain well below 350-400° C. except for those surfaces that do not have a clear radiation cooling path behind, such as envelope film near the Sample Probe that may reach temperatures of up to about 500° C. Deceleration continues with declining heating and g-loads. At a certain point, the external atmospheric pressure reaches the envelope internal pressure of 50 Pa, where the envelope begins to collapse, thus presenting a smaller drag area to the aerodynamic flow and streams behind the Sample Probe. This process continues as the envelope streams further and further behind the probe, acting as an additional drag feature, until the ground is reached.

A feature of this technology is its ability to decelerate a payload from entry to the ground. After entry the system decelerates to subsonic values as the trajectory approaches a purely vertical path and the speed reduces towards terminal velocity. Upon reaching substantial levels of atmosphere, the envelope shrinks in volume and elongates thus creating a streamer that acts as an aerodynamic decelerator that maintains a high drag and low speed. For robust payloads, the slow descent speed may be low enough to prevent damage upon contact with the ground. For more fragile payloads, the streamer effect will act like a drogue chute at very high altitude until a main parachute can be deployed to slow speed even further.

Upon separation from the Orbital Bus, the IAD inflates, and the Sample Probe electronics power on for the first time since pre-launch system integration. At a time afterward, the first GPS coordinates are produced, and the payload periodically transmits those coordinates. Several ground stations track the payload as it approaches entry. Many amateur radio ground stations exist, and part of the concept of operations is broad compatibility with amateur radio hardware having decoding software necessary to obtain GPS coordinates of the IAD and/or Sample Probe, which is automatically sent to a secure server that can combine the data received by those tracking the event to produce an entry trajectory. Additionally, several small mobile ground stations may be provided that use the same electronics as the orbital avionics but run ground station-specific software. Once the Sample Probe lands, the payload turns off the accelerometer and GPS unit. The Sample Probe may continue to broadcast its GPS location until it runs out of battery energy. Tracking of the Orbital Bus, which will precede the Sample Probe in trajectory, may be used to further reduce the Sample Probe entry location to assist in its recovery.

Figure 2C:
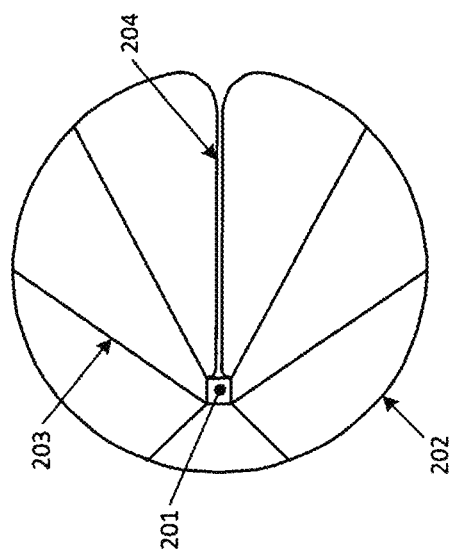
FIG. 2C illustrates an entry system design with the inflated envelope surrounding the Sample Probe.
Figure 2B:
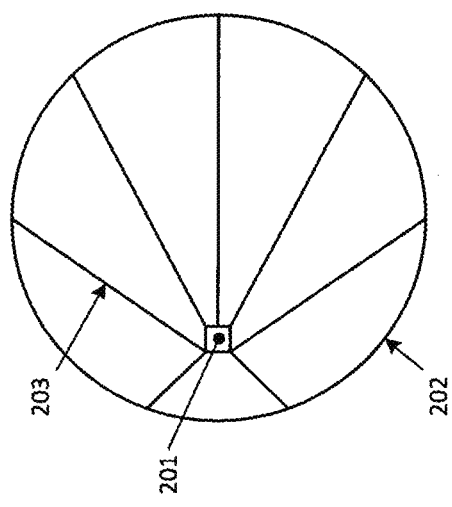
FIG. 2B illustrates an entry system design with the Sample Probe suspended entirely within the envelope.
Figure 2A:
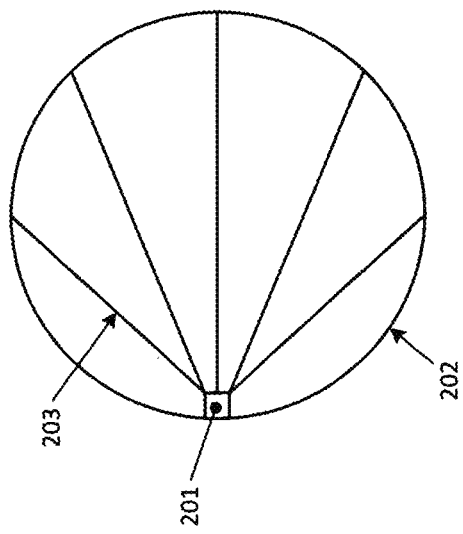
FIG. 2A illustrates an entry system design with the Sample Probe flush with the envelope.

Different variations of the design may be employed. FIGS. 2A, 2B, and 2C illustrate three similar configurations with the Sample Probe 201 internal to the envelope 202 with load lines 203 connecting the Sample Payload to the envelope to distribute the forces during deceleration. In FIG. 2A, the Sample Probe is flush with the leading edge of the envelope. In FIG. 2B, the Sample Probe is suspended entirely inside the envelope. In FIG. 2C, the inflated envelope surrounds the Sample Probe and provides equivalent protection from the external aerothermodynamic heating environment, but the Sample Probe is topologically connected to the external surface of the envelope through the long reentrant neck, 204. The small passageway through the neck is shown open in FIG. 2C for clarity. The inflation pressure inside the envelope completely seals that passageway by forcing the neck material together along the full length since the vacuum of space is inside the neck passageway.

Heating rates are calculated using the Sutton-Graves continuum heating approximation:

$$\dot{Q} = CV^3 \sqrt{\frac{\rho}{R_n}}, \qquad (1)$$

where C, the stagnation-point heating coefficient, varies with atmosphere composition and vehicle shape and is assumed to be $2.849 \times 10^{-8}$ $kg^{1/2}/m$, V is the air-relative velocity, $\rho$ is atmospheric density, and $R_n$ is the nose radius of the envelope or probe.

Changing the altitude at which a delta-V is imparted to initiate final entry results in insignificant changes in the maximum heating rates. As mentioned earlier, when the drag-area is increased, deceleration occurs at higher altitudes and lower density. This results in lower heating rates with larger envelopes. Based on temperature limitations of available materials, the design of FIG. 2 may employ envelopes ranging from 4 to 10 $m^2$, giving heating rates in the 3-5 $W/cm^2$ range for the envelope and 9-14 $W/cm^2$ for the Sample Probe. These values are just for the current design example. Different ranges can be expected with other designs.

Further considerations factor into the appropriate design, including but not limited to orbit decay for different solar activity levels, g-loads, stagnation pressures, envelope and payload maximum heating rates, computational fluid dynamics issues, mass related issues, entry dynamics and landing errors.

An alternate design of the inflatable aerodynamic decelerator includes an SPRS envelope of approximately 3.5 meters in diameter, such as a 3.56 meter diameter inflated sphere made of thin film and inflated to ~50 Pa. The resulting 10 square meter drag area decelerates the 0.3 kg payload at a maximum rate of approximately 9 g. Aerothermal heating produces an expected maximum surface temperature of about 500° C. on the forward surface of the envelope nearest the Space Probe, falling to 350° C. at a radius of 20 cm, and eventually down to 220° C. on the leeward surface. In order to pack a 3.56 m diameter spherical envelope in the available stowage volume, a material thickness of 7.6 μm (0.3 mil) or less may be employed. Based on these requirements, one envelope design may be constructed from a combination of Kapton HN and Upilex-S films, but other thin films or materials having similar properties may be employed.

An envelope configuration according to this embodiment is shown in FIG. 3A. The spherical shape is approximated as an assembly of 16 meridional gores, including meridional gores 301A and 301B. The meridional gores are joined using overlap seams, such as overlap seams 302A and 302B, having a width on the order of 10-15 mm, such as 12.7 mm wide, with a construction as shown in FIG. 3B. The seams carry load from gore to gore and are joined via an adhesive system described below. The meridional gores, such as meridional gores 301A and 301B, each converge to a circular end cap, such as windward end cap 303, at both the windward and leeward ends, where dimensions of the cap may vary but may be in one embodiment on the order of 40 mm. The windward end cap 303 interfaces to a rectangular enclosure that contains the Sample Probe, shown as probe enclosure 304 in FIG. 3A. When the envelope is deployed, this enclosure is positioned entirely within the volume defined by the envelope's approximately 3 m diameter. FIG. 3B shows section A-A, including an overlap 351 between the spherical gores, joined using adhesive.

In one aspect, to tolerate the higher temperature at the windward end cap 303 in view of its associated expected tensile knockdown, the ends of the meridional gores 301 are made of a thicker film, such as a thicker Upilex-S film on the order of one mil. The rest of the envelope, including the leeward end cap (not shown), is made of a Kapton HN film on the order of 0.3 mil.

Figure 4:
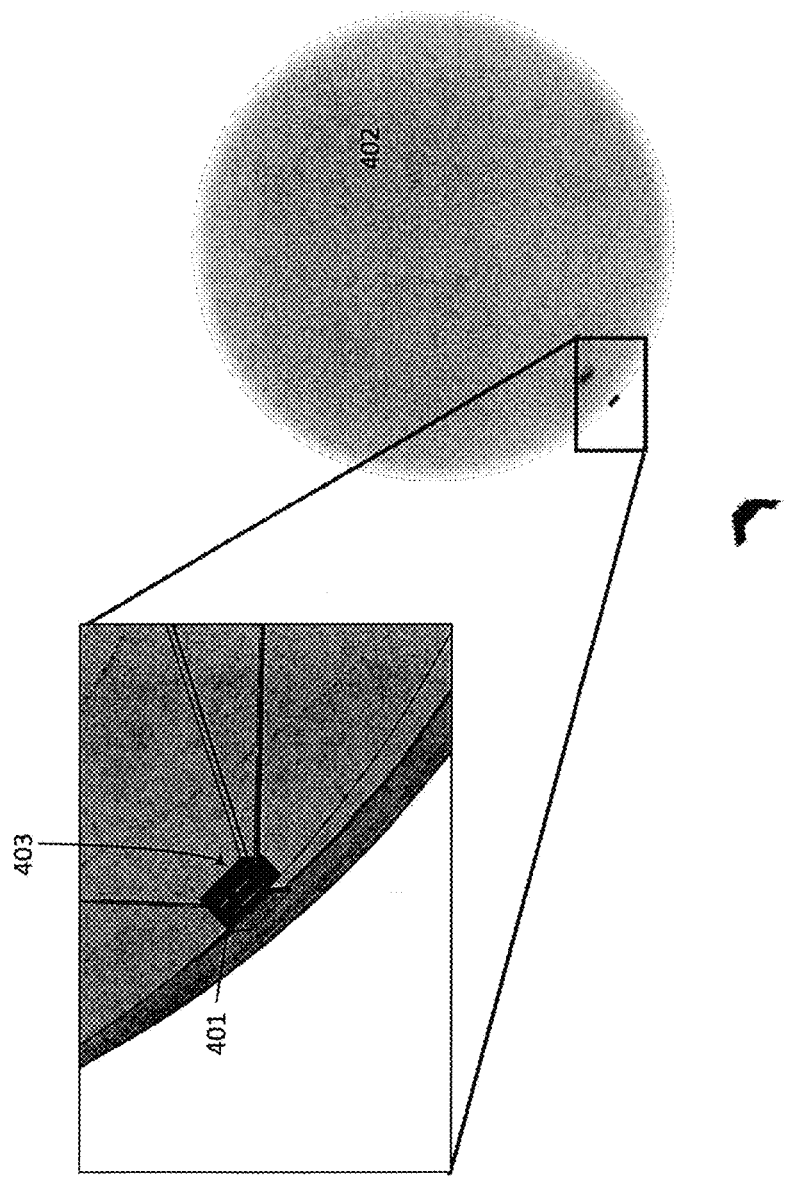
FIG. 4 represents the Sample Probe fully contained or encased within the envelope.

The Sample Probe is fully contained or encased within the envelope as shown in FIG. 4. Such a construction includes Sample Probe 401 and envelope 402. In one embodiment, the enclosure 403 of the Sample Probe 401 is a box structure with an open top. The box structure may in one embodiment comprise a rigid foam wall surrounded by felt insulation such as Nomex felt insulation. Bonded to the front of the rigid foam is a machined aluminum frame. Bonded to the front surface of this frame are two film layers: the first layer (from the outside) is a thin film layer, such as Upilex-S, at the windward end cap of the envelope 402. Adhesively bonded directly under that film layer is a thin film enclosure or "bag," such as an Upilex-S rectangular bag that encapsulates the enclosure of the Sample Probe 401, ensuring that gas from the envelope 402 does not escape through the enclosure.

Figure 5:
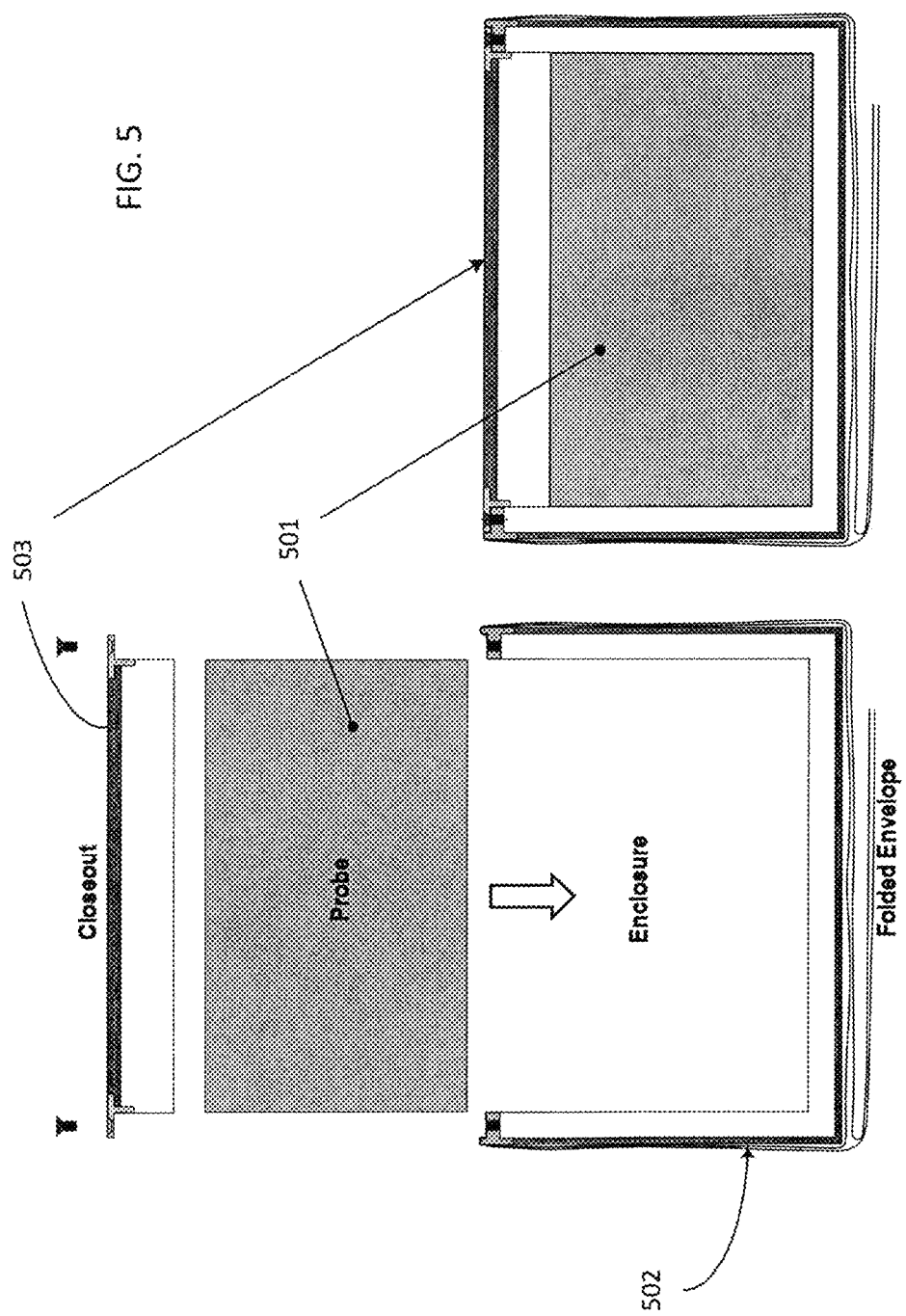
FIG. 5 is a Sample Probe enclosure with closeout.

FIG. 5 illustrates the Sample Probe enclosure. The Sample Probe 501 fits inside the rigid foam walls of enclosure 502 and is enclosed by a closeout assembly 503. The closeout 503 is comprised of a machined aluminum frame, and the apparatus includes a thick rigid foam layer, and a felt insulation layer, such as a Nomex layer on the order of 2 mm in thickness, covered on the outermost surface with a thin titanium foil.

Figure 6:
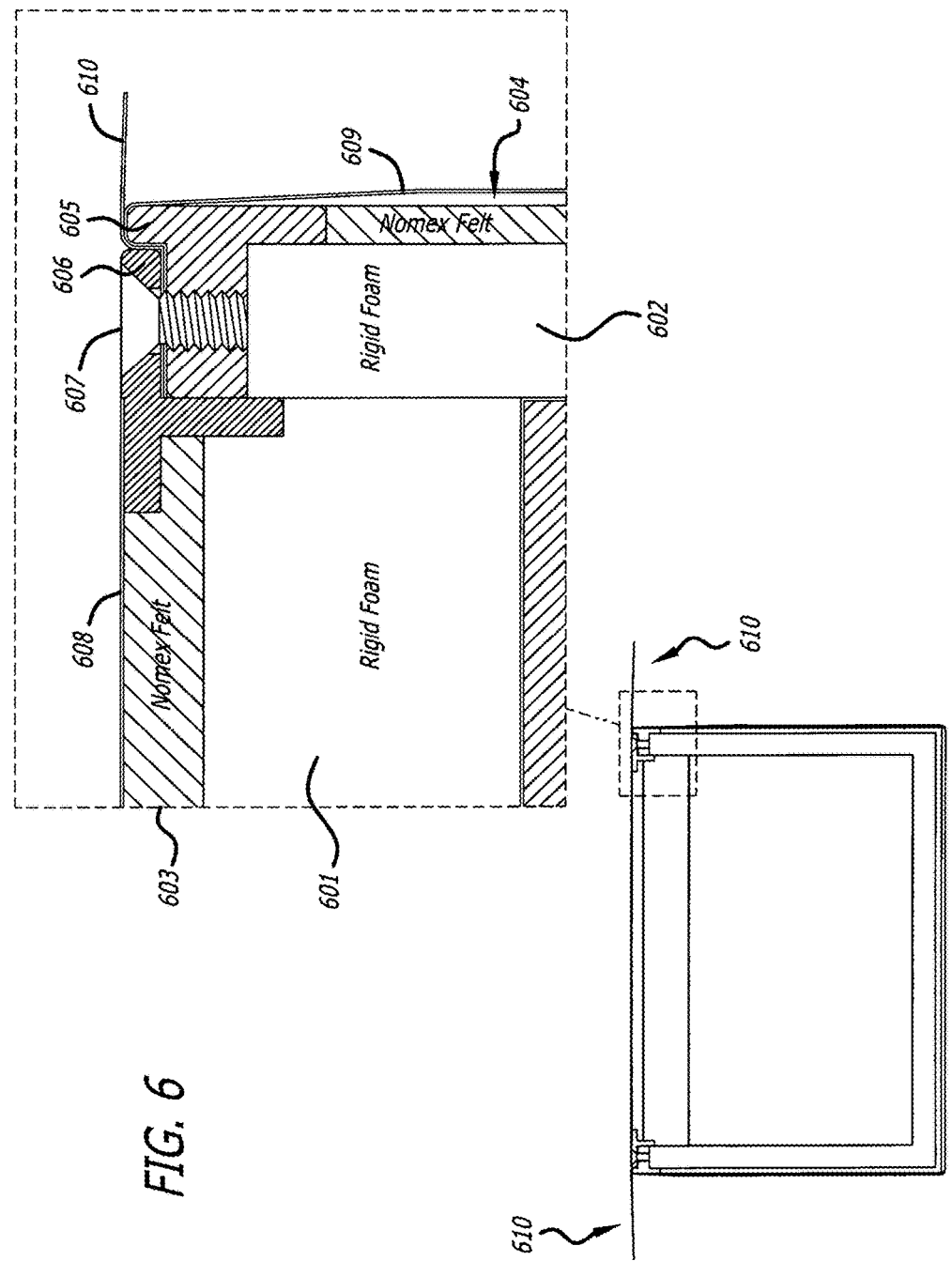
FIG. 6 illustrates the detail of the Sample Probe enclosure.

The spherical envelope 402 is folded up in the space directly behind the enclosure when stowed. Details of the enclosure construction are shown in FIG. 6. Rigid foam areas 601 and 602 are provided within felt regions 603 and 604. Inner frame 605 and outer frame 606 are shown, and they may be joined by any appropriate joining devices or adhesives, and in this view screw 607 is shown. Titanium foil 608 is provided at the top, and enclosure bag 609 is provided at the exterior. The films are bonded together, and an envelope end cap 610 is shown.

Inertial load for the envelope and Space Probe in flight is expected to exceed 25 Newtons. Application of this load to the forward surface of the inflated envelope may result in significant envelope distortion at the payload interface. Such distortion of the envelope is undesirable, potentially causing high loads to the film and increased aero-heating. One manner of addressing this issue and providing a nearly spherical shape to the flow field is shown in FIG. 7.

Figure 7:
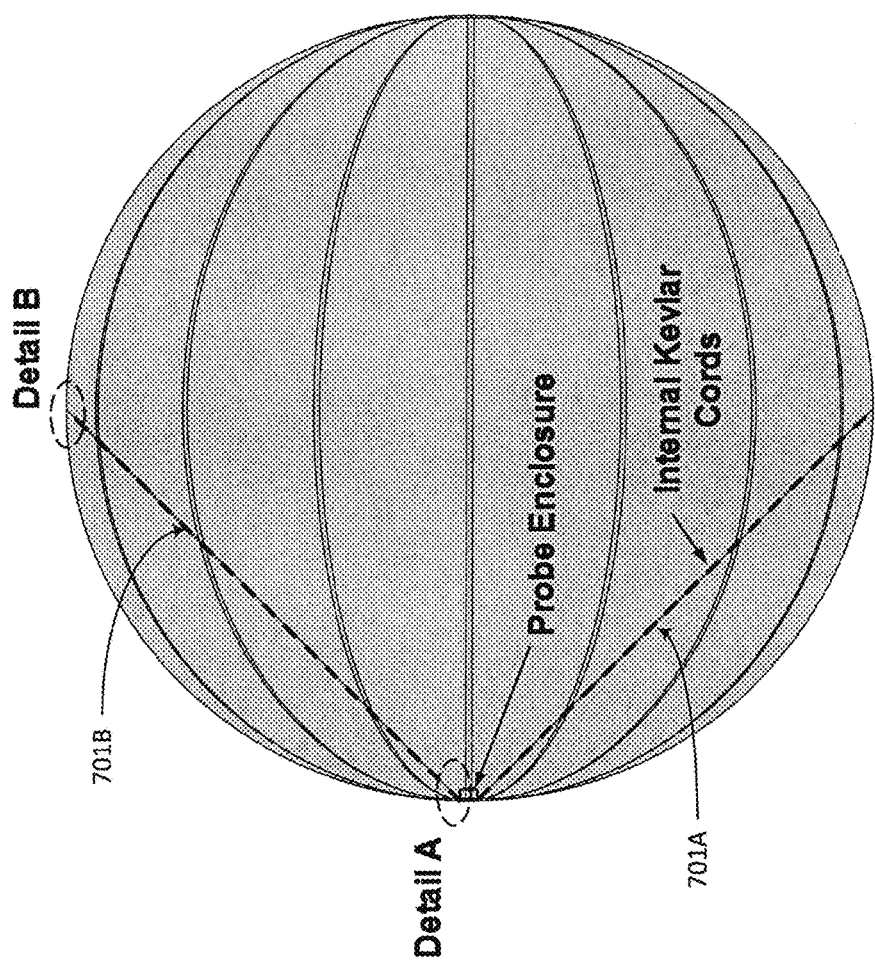
FIG. 7 is the envelope with internal tension lines or cords provided.

FIG. 7 illustrates two of multiple, such as 16, internal tension lines or cords including cords 701A and 701B, employed to connect the payload enclosure to the envelope walls at or near the equator of the envelope. The cords employed may be any cord sufficient to provide the necessary tension, strength, and flexibility to perform the requisite function, and one example of such a cord is a Kevlar cord (thread) that has a diameter of 0.25 mm, weighs 0.073 g/m and has a tensile strength of 102 N.

Detail A and Detail B of FIG. 7 are represented in FIGS. 8 and 9, respectively. The cords interface to the Sample Probe enclosure as shown in FIG. 8, in one instance passing through a reinforced and sealed hole in the enclosure bag, wherein a small hole is provided in the aluminum frame where the cord terminates using an appropriate retention mechanism, such as a stopper knot. FIG. 8 illustrates a reinforced hole in the enclosure bag 801, the cord 802, representing one of multiple cords, a silicone sealant 803 which is optional, a hole 804 in the frame for the cord to pass through, and a recess 805 in the rigid foam for a stopper knot.

At the other end, shown in FIG. 9, cord 802 passes through the envelope wall 901 at or approximately at the equator and attaches to the external surface of the envelope, thus keeping the attachment in shear and avoiding a peel separation mode. The cord 802 is stitched to, in one embodiment, a patch of Kevlar-scrim reinforced polyimide 902 that is bonded on the envelope exterior surface directly over a reinforced hole. The cord loop 903 passes through the hole to the envelope interior. The entire assembly has a sealing patch 904 to render the interface gas-retaining.

Figure 11:
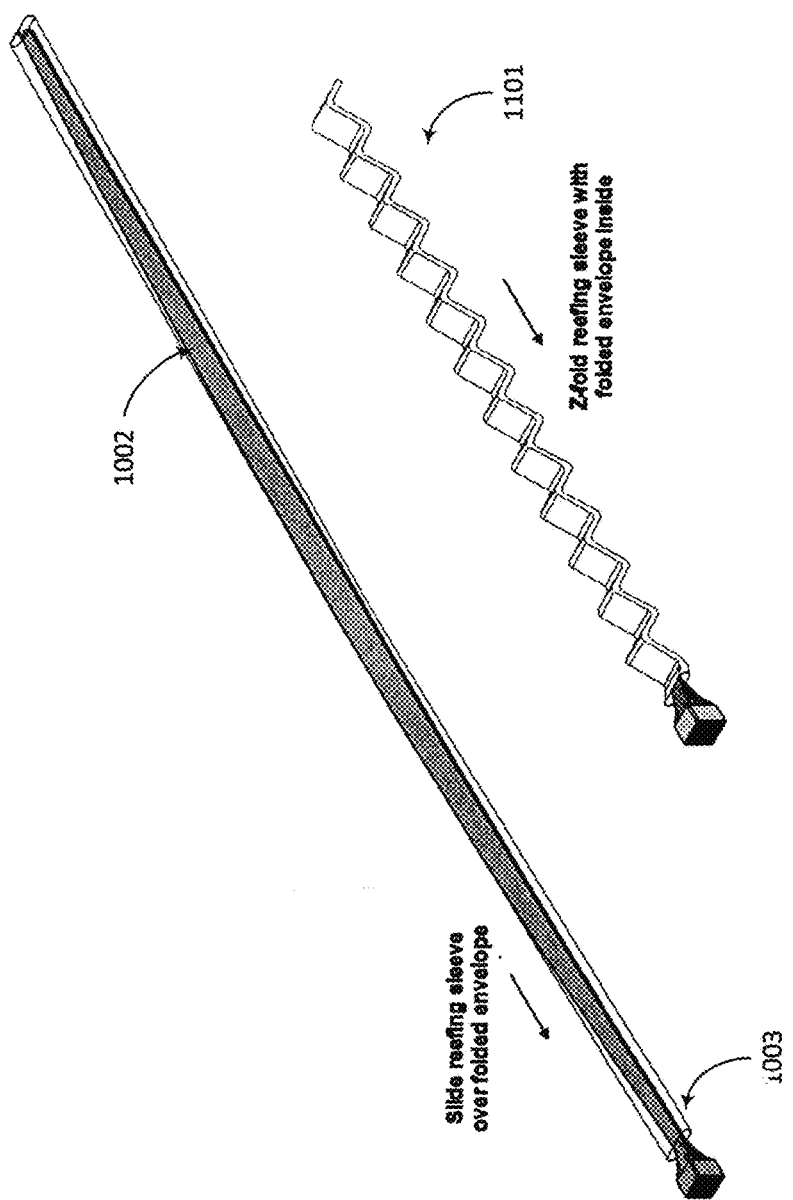
FIG. 11 illustrates stowing the envelope and reefing sleeve.

Folding of the envelope may be as shown in FIG. 10 in one embodiment. To stow the envelope 1001, the envelope is laid to a maximum length from pole to pole (end cap to end cap). Because the cords are shorter than the gore length from the pole to the equator, the narrower region behind the payload is double-folded first. The resultant piece is then Z-folded as shown in FIG. 11, where folded envelope/sleeve 1101 is the reefing sleeve Z-folded with the folded envelope inside. In one embodiment, the folded stack 1002 is about 2.8 m long and 81 mm wide. The reefing sleeve 1003 is employed to control the rate at which the envelope deploys. The reefing sleeve 1003 may be made of a thin film, such as a 25.4 micrometer Mylar film. The film is 2.8 m long and of a diameter that allows the folded envelope to be slid inside the reefing sleeve 1003 from one end. One end of this reefing sleeve 1003, corresponding to the leeward end of the envelope (i.e., opposite the payload enclosure end) may include a lengthwise notch 1004. When the envelope 1001 begins to inflate inside the reefing sleeve 1003, this lengthwise notch 1004 becomes the initiation site for a tear that will propagate along the length of the reefing sleeve 1003. Two parallel strips of Mylar tape, for example, may be applied to either side of the desired tear, guiding the tear and ensuring that the tear propagates in the intended direction. In this manner, even if a small amount of residual air remains in the envelope 1001, the deployment proceeds slowly so that large inertial forces do not accrue in the unfolding structure. At the end of the deployment, the sleeve tears completely and separates from the envelope 1001.

FIG. 11 illustrates the reefing sleeve 1003 slid over the folded envelope 1001, and the Z-fold of the reefing sleeve 1003 with the folded envelope inside. The folded envelope/sleeve 1101 is then Z-folded, and the Z-folded assembly is held in place by swing arms of the Orbital Bus until the swing arms are released and inflation begins. Alternatively, the envelope may be Z-folded within a cylindrically stowed sleeve to provide an improved deployment sequence.

Inflation

The inflation of the envelope at, for example, a nominal altitude of 200 km is initiated by separating the four side panels of the Orbital Bus structure, such as that offered on the CubeSat, and swinging them out of the way using a spring or other appropriate opening mechanism, such as torsional springs. Four side panels remain attached to the Orbital Bus. The square top remains attached to one of the sides and also may be spring loaded to swing outward and against the outside of the panel and out of the way of the envelope. At the same time, springs or a similar arrangement push the Sample Probe and stowed envelope away from the Orbital Bus. The reefing sleeve is used to slow down and guide the initial inflation of the envelope, and the reefing sleeve is opened quickly after ejection of the reefed envelope from the confines of the re-entry vehicle structure, possibly by tearing the reefing sleeve along predefined score lines using the internal pressure as discussed above. This action allows the envelope to expand under the influence of gases inside the envelope. This gas is, in one embodiment, a combination of vapors from subliming solids or vaporizing liquids and non-condensing gases trapped inside the envelope during packing and stowage on the ground.

Initial "prompt" inflation is under the influence of gases in the envelope at release, which is a combination of non-condensing gas plus the partial pressure of subliming materials plus any additional vaporization (sublimation) of solid during the short time that the envelope is expanding. Enough pressure is necessary to overcome "static cling" and ensure that inflation occurs. Envelopes typically incorporate a powder, such as talc, to act as a "blocking material" to combat this issue. However, a significant concern is to keep the pressure low enough that the envelope will not snap open too quickly and lead to rupture.

While the envelope is still stowed, the pressure inside the envelope will equal the sum of the partial pressures for each substance plus the pressure due to the trapped non-condensing gas. The partial pressure of the subliming solids is a function of temperature. The flight system in one embodiment may not have an active temperature control system, so the range of possible initial temperatures may be governed by the passive thermal control design. The expected internal temperature range is around room temperature. With this range of temperature, the apparatus may require more than one subliming solid to keep the corresponding range of initial pressures manageable. A small amount of one substance with a relatively high sublimation pressure may be used, and a larger quantity of another substance with a lower sublimation pressure may be used. If the temperature is on the low end of the expected range, the higher vapor pressure substance will have enough pressure to complete the initial inflation. But the quantity is of such magnitude so that if it completely sublimates, the resultant gas does not over-pressurize the envelope. If the temperature is higher, more of the lower pressure substance will participate, so the pressure will be a bit higher than for the cold situation, but not significantly higher. A greater quantity of the lower sublimation pressure material may be required to keep the envelope inflated over the subsequent 20 minutes (sustaining pressure), and as the system begins to experience greater heating, this substance sublimates more and raises the pressure as needed to keep the envelope taut so it remains spherical despite the increasing external dynamic pressure.

The effect of trapped gas on the inflation of the envelope can be problematic. The present envelope is significantly smaller than previous envelopes, so the trapped gas issue is not as severe.

To mitigate the effects of trapped air, the present design may employ puncturing of the envelope at a number of reinforced points to allow the trapped gas to vent into space before inflation. The subliming solid may be stored inside wax-sealed pouches and released using heat. The mass of subliming solid is ample to keep the envelope filled for a period of time despite the small amount of leakage through the small vent holes. The second embodiment is to replace the air in the envelope by vapor of the sublimating solids. This air replacement may be accomplished by flowing gases from heated sublimating solids through the envelope to displace air in the envelope. The strung out envelope may be confined to a small but lengthy volume inside a tube that may be partially evacuated. A third embodiment includes the aforementioned reefing sleeve surrounding the envelope, which can perform the function of reducing the leakage of inflation gas through seam defects during storage prior to launch and during the orbital phase of the mission. The reefing sleeve will ensure a controlled inflation of the envelope to prevent damage.

Orbital Bus

The Orbital Bus electronics are selected and defined with the detailed design of the deployment mechanism(s) and structure depending on the Sample Probe and envelope design. The Sample Probe should remain contained within the envelope while deployed as described previously. Keeping the Sample Probe within the envelope as opposed to protruding from the envelope reduces heating rates and eliminates the need for a deployable aeroshell. The Orbital Bus includes the on-orbit communication, power, data handling, thermal control, structure and devices, and sensors subsystems needed to support the Sample Probe prior to entry. One embodiment of the Orbital Bus subsystem includes avionics and a radio, a battery and solar array, and structure, such as the CubeSat structure and devices and its interface to the P-POD deployer.

The Orbital Bus generally provides the ability to communicate with ground stations throughout the orbital phase, provide detailed orbit determination data via onboard GPS, encapsulate and support the IAD and Sample Probe, initiate deployment and separation events, and possibly provide pathfinder tracking data prior to vehicle entry.

Figure 12:
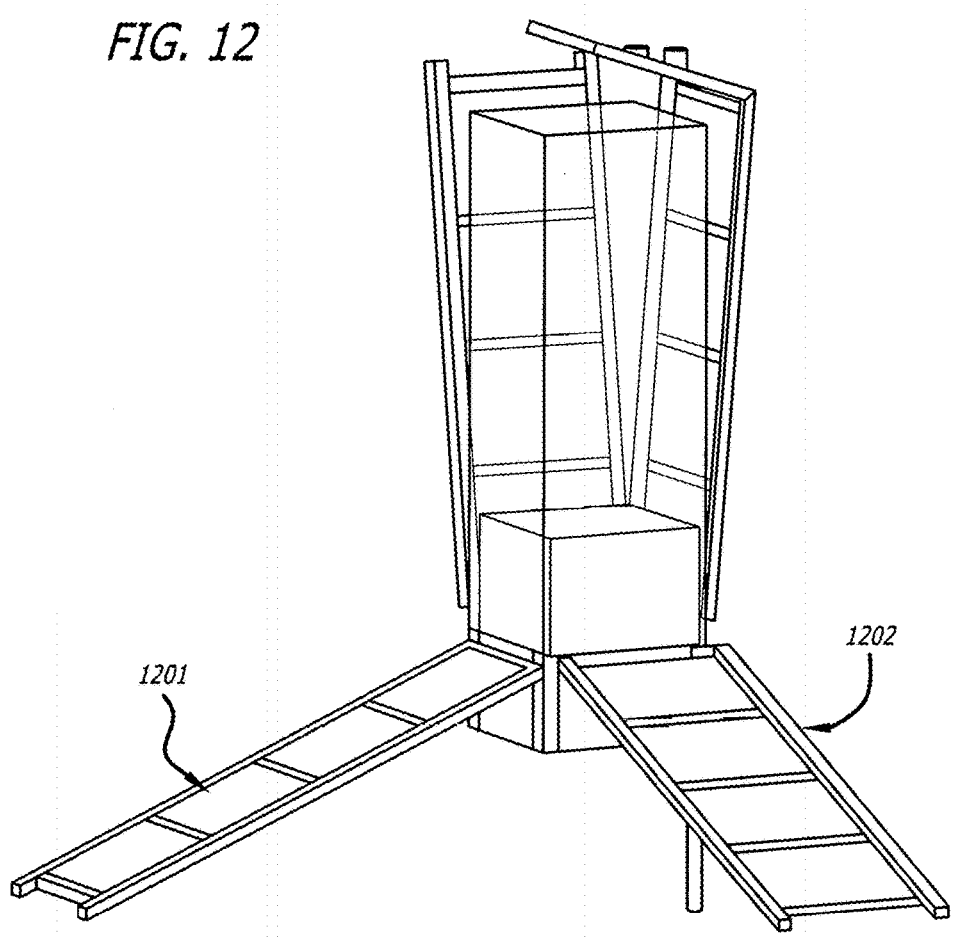
FIG. 12 shows the Orbital Bus with two side panels deployed.

The Orbital Bus configuration is designed to maximize the volume available to the Sample Probe, deploy the Sample Probe, and maintain the required dimensions and interfaces with the P-POD. FIG. 12 illustrates and outlines the baseline deployment sequence for the Sample Probe. The initial deployment, in one embodiment, utilizes a burn wire circuit on the +Z panel that involves running high current for a short duration through a Nichrome wire held in tension across narrow line (fishing line) used to constrain the deployable XY panels. The deployable XY panels 1201 and 1202 rotate out of the way of the inflating envelope via torsion springs near the Orbital Bus avionics. Finally, separation springs push the Orbital Bus and entry hardware apart activating, the deployment switches on the probe, thus turning on the probe.

Sample Probe

The Sample Probe includes radios, avionics, power, thermal control and sensors for monitoring the entry and landing. The Sample Probe system has several subsystems including accelerometers, including one for landing and one for entry loads, internal temperature measurement devices, a battery, avionics and radios, and structure and thermal insulation. A single, three axis accelerometer can provide less than 10 G acceleration sensing with adequate resolution. Multiple accelerometers, such as single axis accelerometers can be mounted and monitor the G range.

The Sample Probe records entry measurement data, film stresses, and entry acceleration measurements, provides GPS location data after separation event through to landing, provides tracking telemetry to aid in recovery, and provides search beacon for ground recovery.

The Sample Probe avionics consists of a Probe Main Board, with microcontroller, memory, battery interface, power regulation, switching that isolates the positive terminal of the primary battery from the rest of the electronics while still attached to the orbital avionics and accelerometers, and a UHF Communication System similar to that described above in the Orbital avionics section. Power will likely be reduced. Antennas are mounted to obtain an omnidirectional radiation pattern along the X- and Y-axes of the probe. A NovaTel OEMStar GPS is provided similar to the Orbital Bus avionics, and Primary Batteries are provided.

The Sample Probe fits within the Orbital Bus deployable panels and maximizes volume available to the envelope to relax the packing factor requirements. Contained within the insulation are all the components that consist of the payload electronics described in the previous section. The cross section of FIG. 13 shows insulation with an example closeout feature that includes two deployment switches used to turn the payload electronics on once the probe has separated from the Orbital Bus.

Figure 13:
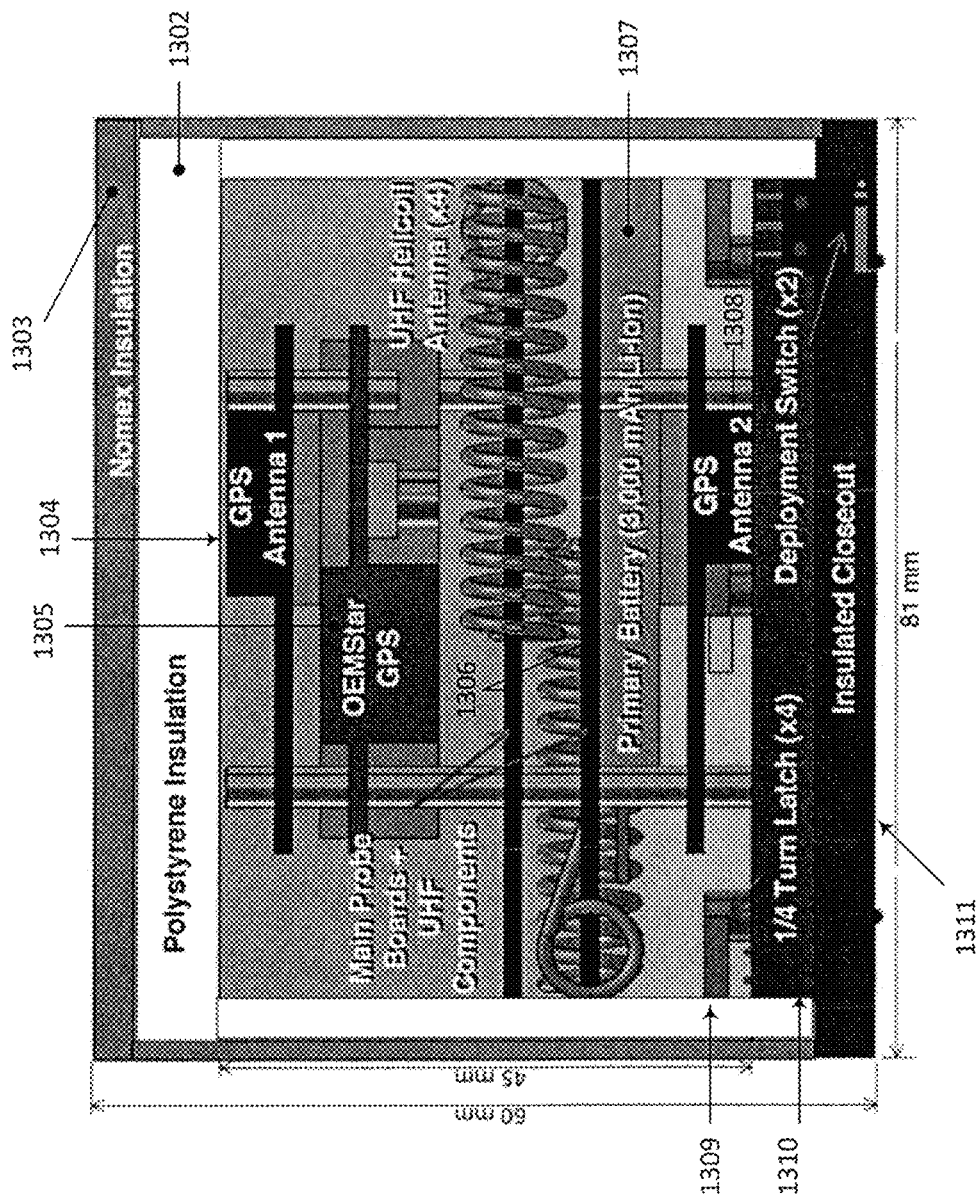
FIG. 13 is a cross section showing various components of the Sample Probe.
Figure 14:
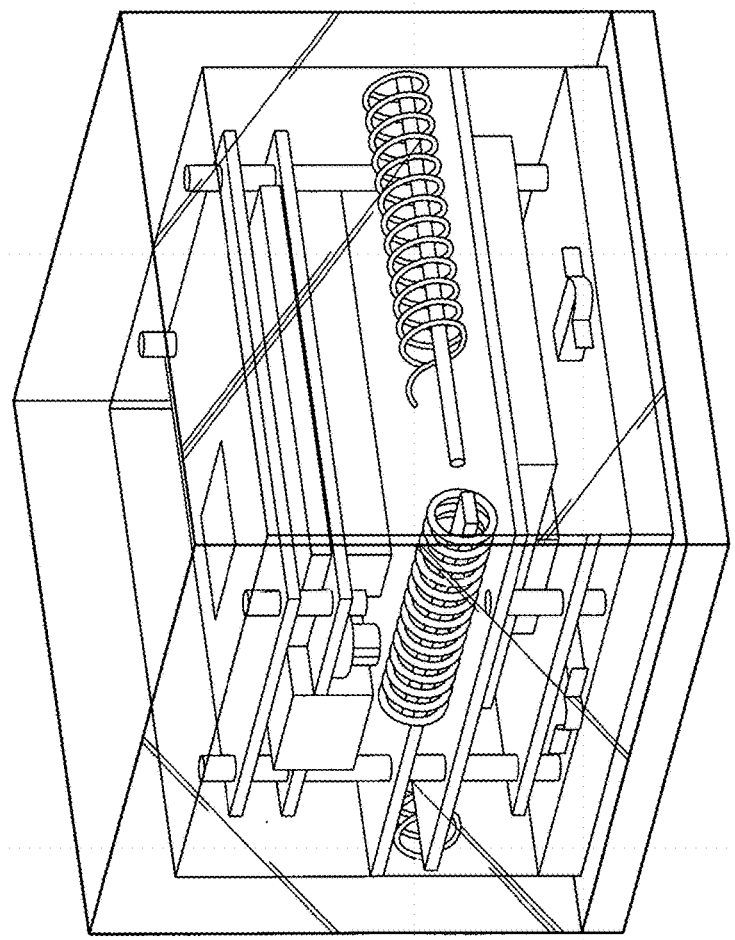
FIG. 14 is a perspective view showing components of the Sample Probe.

FIG. 13 illustrates a cross section of the Sample Probe, including Nomex or other insulation 1301, polystyrene or other insulation 1302, GPS antenna one 1303, GPS 1304, UHF helicoil antenna 1305, potentially including four such antennas, main probe boards and UHF components 1306, primary battery 1307, GPS antenna two 1308, quarter turn latch 1309, deployment switch 1310, possibly including two such switches, and insulated closeout 1311. Dimensions are in the tens of millimeters and total height and width may each be less than 100 mm, such as in the range of 60 to 80 or 85 millimeters. FIG. 14 is a perspective view of the Sample Probe showing various components presented in FIG. 13 from a different angle.

Thus according to the present design there is provided an inflatable aerodynamic decelerator comprising an inflatable envelope configured to be folded within an enclosure, and an inflatant, wherein expulsion of the enclosure from an entry vehicle causes the inflatant to react and form gas filling the inflatable envelope to an inflated state, wherein the inflated state of the inflatable envelope surrounds the enclosure. Lines may be provided connecting the enclosure to interior positions of the inflatable envelope when the inflatable envelope is in the inflated state.

According to one embodiment of the present design, there is provided an inflatable aerodynamic decelerator for use with an atmospheric entry payload. The inflatable aerodynamic decelerator comprises an inflatable envelope and an inflatant. The inflatant is configured to fill the inflatable envelope to an inflated state such that the inflatable envelope surrounds the atmospheric entry payload, causing aerodynamic forces to decelerate the atmospheric entry payload.

According to another embodiment of the present design, there is provided an apparatus, comprising a payload and an inflatable envelope configured to be inflated to include the payload by an inflatant. The inflatant filling the inflatable envelope to an inflated state causes the inflatable envelope to surround the payload and aerodynamic forces to decelerate the atmospheric entry payload.

According to another embodiment of the present design, there is provided a method for causing a payload to descend at a desired rate, comprising providing an inflatable envelope and inflating the inflatable envelope to an inflated state, wherein the inflatable envelope surrounds the payload when inflated to the inflated state, causing aerodynamic forces to decelerate the atmospheric entry payload.

The devices, processes and features described herein are not exclusive of other devices, processes and features, and variations and additions may be implemented in accordance with the particular objectives to be achieved. For example, devices and processes as described herein may be integrated or interoperable with other devices and processes not described herein to provide further combinations of features, to operate concurrently within the same devices, or to serve other purposes. Thus it should be understood that the embodiments illustrated in the figures and described above are offered by way of example only. The invention is not limited to a particular embodiment, but extends to various modifications, combinations, and permutations that fall within the scope of the claims and their equivalents.

The design presented herein and the specific aspects illustrated are meant not to be limiting, but may include alternate components while still incorporating the teachings and benefits of the invention. While the invention has thus been described in connection with specific embodiments thereof, it will be understood that the invention is capable of further modifications. This application is intended to cover any variations, uses or adaptations of the invention following, in general, the principles of the invention, and including such departures from the present disclosure as come within known and customary practice within the art to which the invention pertains.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An inflatable aerodynamic decelerator, comprising:
an atmospheric entry payload having an exterior surface;
an inflatable envelope configured to completely surround all of the exterior surface of the atmospheric entry payload when inflated; and
an inflatant;
wherein the inflatant is configured to fill the inflatable envelope to an inflated state completely surrounding the atmospheric entry payload, causing aerodynamic forces to decelerate the atmospheric entry payload.

2. The inflatable aerodynamic decelerator of claim 1, further comprising restraining means configured to maintain the inflatable envelope and the atmospheric entry payload prior to inflation of the inflatable envelope.

3. The inflatable aerodynamic decelerator of claim 2, wherein the inflatant comprises a gas, the gas configured to fill the inflatable envelope to an inflated state subsequent to release of the restraining means.

4. The inflatable aerodynamic decelerator of claim 1, further comprising connecting means joining the atmospheric entry payload to the inflatable envelope when the inflatable envelope is in the inflated state.

5. The inflatable aerodynamic decelerator of claim 2, wherein the inflatant is a subliming solid placed within the inflatable envelope when in the restraining means.

6. The inflatable aerodynamic decelerator of claim 1, wherein the inflatant is a vaporizing liquid.

7. The inflatable aerodynamic decelerator of claim 1, wherein the inflatant is at least one reacting chemical configured to provide a gas.

8. The inflatable aerodynamic decelerator of claim 1, wherein the inflatant originates from a pressurized vessel.

9. The inflatable aerodynamic decelerator of claim 1, wherein the inflatant is introduced into the inflatable envelope prior to inflation of the inflatable envelope.

10. The inflatable aerodynamic decelerator of claim 2, wherein the inflatable envelope is encased in a reefing sleeve when inside the restraining means.

11. The inflatable aerodynamic decelerator of claim 10, wherein the reefing sleeve is configured to tear when the inflatable envelope is inflated.

12. The inflatable aerodynamic decelerator of claim 1, wherein the inflatable envelope is formed of a relatively thin material.

13. An apparatus, comprising:
a payload having an exterior surface; and
an inflatable envelope configured to be inflated to completely envelop all of the exterior surface of the payload using an inflatant;
wherein the inflatant filling the inflatable envelope to an inflated state causes the inflatable envelope to completely surround the payload and aerodynamic forces to decelerate the atmospheric entry payload.

14. The apparatus of claim 13, further comprising connecting means joining the payload to the inflatable envelope when the inflatable envelope is in the inflated state.

15. The apparatus of claim 13, wherein the inflatant is a subliming solid initially located within the inflatable envelope.

16. The apparatus of claim 13, wherein the inflatant is a vaporizing liquid.

17. The inflatable aerodynamic decelerator of claim 1, wherein the inflatant is at least one reacting chemical configured to provide a gas.

18. The apparatus of claim 13, wherein the inflatant originates from a pressurized vessel.

19. The apparatus of claim 13, wherein the inflatant is introduced into the inflatable envelope prior to inflation of the inflatable envelope.

20. The apparatus of claim 13, wherein the inflatable envelope is initially encased in a reefing sleeve and folded and restrained by a restraining means.

21. The apparatus of claim 20, wherein the reefing sleeve is configured to tear away from the inflatable envelope when the inflatable envelope is inflated.

22. The apparatus of claim 17, wherein the inflatable envelope is formed of a relatively thin material.

23. The inflatable aerodynamic decelerator of claim 1, wherein a close-out panel forms a portion of the inflatable envelope that completely surrounds the exterior surface of the atmospheric entry payload.

* * * * *